United States Patent

(12) United States Patent
Lin

(10) Patent No.: US 10,528,289 B2
(45) Date of Patent: Jan. 7, 2020

(54) DATA STORAGE METHOD FOR OPTIMIZING DATA STORAGE DEVICE AND ITS DATA STORAGE DEVICE

(71) Applicant: Silicon Motion, Inc., Jhubei (TW)

(72) Inventor: Yu-Chih Lin, Zhubei (TW)

(73) Assignee: Silicon Motion, Inc., Jhubei (TW)

( * ) Notice: Subject to any disclaimer, the term of this patent is extended or adjusted under 35 U.S.C. 154(b) by 76 days.

(21) Appl. No.: 15/863,449

(22) Filed: Jan. 5, 2018

(65) Prior Publication Data
US 2019/0065055 A1    Feb. 28, 2019

(30) Foreign Application Priority Data
Aug. 25, 2017    (TW) .............................. 106128933 A

(51) Int. Cl.
*G06F 3/06*    (2006.01)
(52) U.S. Cl.
CPC ............ G06F 3/0659 (2013.01); G06F 3/061 (2013.01); G06F 3/0685 (2013.01)
(58) Field of Classification Search
None
See application file for complete search history.

(56) References Cited

U.S. PATENT DOCUMENTS

| | | | | |
|---|---|---|---|---|
| 2003/0120871 A1* | 6/2003 | Ayaki | ................... | G06F 3/0601 711/137 |
| 2012/0159072 A1* | 6/2012 | Hida | ................... | G06F 12/0862 711/119 |
| 2014/0189247 A1 | 7/2014 | Hughes et al. | | |
| 2015/0201018 A1* | 7/2015 | Abram | ................ | H04L 67/1097 707/736 |
| 2015/0277786 A1* | 10/2015 | Rostock | .................. | G06F 3/061 711/103 |
| 2016/0283395 A1* | 9/2016 | Jung | ..................... | G06F 3/0613 |

FOREIGN PATENT DOCUMENTS

| | | |
|---|---|---|
| CN | 1516030 A | 7/2004 |
| TW | 446150 U | 7/2001 |
| TW | 201633138 A | 9/2016 |

* cited by examiner

*Primary Examiner* — Charles J Choi
(74) *Attorney, Agent, or Firm* — Wang Law Firm, Inc.

(57) ABSTRACT

A data storage device includes a flash memory and a controller. The flash memory is utilized to store at least one data. The controller is coupled to the flash memory to receive at least one read command transmitted from a host, and reads the data stored by the flash memory according to the read command. The controller determines whether or not the length of the read command is greater than a first predetermined value. If the length is greater than the first predetermined value, the controller arranges the read command on a sequential queue. If the length is not greater than the first predetermined value, the controller arranges the read command on a random queue. The controller executes the read command of the random queue at high priority.

14 Claims, 4 Drawing Sheets

| Read Command | #1 | #2 | #3 | #4 | #5 | #6 |
|---|---|---|---|---|---|---|
| Corresponding Address | CE0 | CE0 | RAM | CE1 | CE1 | RAM |

DT (pointing to #5)

DATA STORAGE METHOD FOR OPTIMIZING DATA STORAGE DEVICE AND ITS DATA STORAGE DEVICE

CROSS REFERENCE TO RELATED APPLICATIONS

This Application claims priority of Taiwan Patent Application No. 106128933 filed on Aug. 25, 2017, the entirety of which is incorporated by reference herein.

BACKGROUND OF THE INVENTION

Field of the Invention

The disclosure generally relates to a data storage device and a data storage method for inspecting the data storage device, and more particularly, to a data storage device and a data storage method which can handle read commands of different lengths by utilizing random queue and sequential queue.

Description of the Related Art

The flash memory is a general non-volatile data storage device, which is utilized for erasing and programming electrically. For example, the NAND flash could be utilized as a memory card, a USB flash device, SSD, eMMC or UFS.

Various read commands of different lengths will be transmitted from the host to the data storage device. To execute read commands of different lengths requires that the data storage device spend a different amount of time on each, and the performance and speed of accessing data using the data storage device will be affected. Therefore, an efficient data storage device is needed to schedule and optimize the read commands of different lengths in order to confirm the reliability and performance of accessing data.

BRIEF SUMMARY OF THE INVENTION

In order to solve the aforementioned problem, the invention proposes a data storage device and a data storage method to detect the length of a read command and arrange the read command in the random queue or the sequential queue accordingly. Specifically, the data storage device executes the read command in the random queue at high priority, and real-time updates the status of the random queue and the sequential queue with a table. Therefore, the performance and reliability of accessing the data could be confirmed.

In one aspect of the invention, the present invention provides a data storage device which includes a flash memory and a controller. The flash memory is utilized to store at least one data. The controller is coupled to the flash memory to receive at least one read command transmitted from a host, and reads the data stored by the flash memory according to the read command. The controller determines whether or not the length of the read command is greater than a first predetermined value. If the length is greater than the first predetermined value, the controller arranges the read command in a sequential queue. If the length is not greater than the first predetermined value, the controller arranges the read command in a random queue. The controller executes the read command of the random queue at high priority.

In another aspect of the invention, the present invention provides a data storage method utilized for optimizing a data storage device. The data storage device comprises a flash memory, a controller and a RAM. The flash memory comprises a plurality of storage planes, each of the storage planes comprises a plurality of blocks, and each of the storage planes is coupled to the controller by a channel. The data storage method includes receiving at least one read command transmitted from the host, wherein the read command is utilized for reading the data stored by the flash memory; determining whether or not the length of the read command is greater than a first predetermined value. When the length is greater than the first predetermined value, the controller arranges the read command in a sequential queue, when the length is not greater than the first predetermined value, the controller arranges the read command in a random queue. The data storage method further includes executing the read command in the random queue at high priority.

BRIEF DESCRIPTION OF DRAWINGS

FIG. 4 is a schematic diagram of storing read command and its related information by utilizing a table according to an embodiment of the invention;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF THE INVENTION

Figure 1:
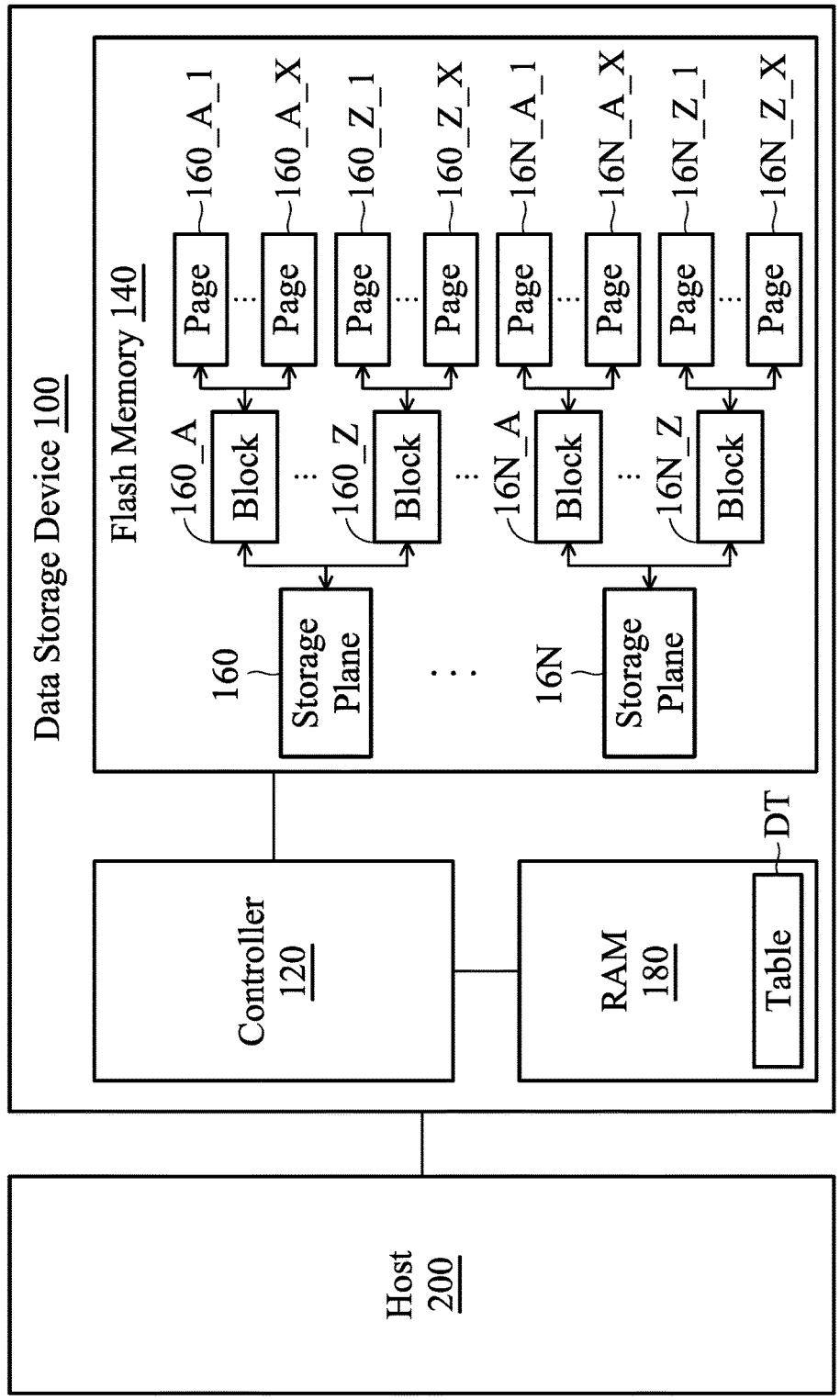
FIG. 1 is a schematic diagram of a data storage device and a host according to an embodiment of the invention.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a schematic diagram of a data storage device 100 and a host 200 according to an embodiment of the invention. In one embodiment, the data storage device 100 includes a controller 120, a flash memory 140 and a random access memory (RAM) 180. The data storage device 100 is coupled to the host 200 to transmit data and command or to receive data and command. The memory 140 could be non-volatile memory such as NAND flash. The data storage device 100 may include (but not limit to): a portable storage device (such as memory card complying with the standards of SD/MMC, CF, MS, XD or UFS), a solid state drive (SSD) and various kinds of embedded storage device (such as embedded storage device complying with the standards of UFS or EMMC). The host 200 may be any one of a variety of electronic devices such as a cell phone, a tablet computer, a laptop computer, a navigating apparatus, a car system, or a processor inside the above electronic devices.

As shown in FIG. 1, the controller 120 is coupled to the flash memory 140 and the RAM 180. The RAM 180 is utilized to temporarily store and cache the data which is needed by the controller 120, or temporarily store the data which will be written to the flash memory 140 by the host 200 in order to facilitate the access time of the data storage device 100. The controller 120 performs a reading operation on the flash memory 140 by controlling the flash memory 140 with the unit of a cluster. In addition, the controller 120 is coupled to the flash memory 140 to transmit data and instructions or to receive data and instructions mutually. Furthermore, the controller 120 can be a read-only-memory (ROM) and a micro-controller with firmware code, and the micro-controller executes the firmware code to operate or access the memory 140.

The flash memory 140 includes a plurality of planes 160~16N. Each of the planes 160~16N is coupled to the controller 120 respectively by a channel (not shown). In one embodiment, a portion of each storage plane 160~16N constitutes a super block, and the flash memory 140 includes a plurality of super blocks. Specifically, each of the super blocks 160~16N includes a plurality of blocks. In another embodiment, the plane is the super block. For example, the flash memory 140 has four super blocks (CE0~CE3). The storage plane 160 includes the blocks 160_A~160_Z, and the storage plane 16N includes the blocks 16N_A~16N_Z. Regarding the storage plane 160, each of the blocks 160_A~160_Z further includes a plurality of pages. The block 160_A includes the pages 160_A_1~160_A_X, and the block 160_Z includes the pages 160_Z_1~160_Z_X. The size of each page is N bytes, and N is a positive integer greater than one.

For example, each of the storage planes 160~164 includes 820 blocks, and each of the blocks includes 256 pages. The size of each page is 16 KBytes. In addition, the pages 160_A_1~16N_Z_X are physical pages. When the controller 120 performs a writing operation or a programming operation on the flash memory 140, it controls the flash memory 140 to perform the writing or programing operation with the unit of a physical page.

Regarding the flash memory 140, each of the pages 160_A_1~16N_Z_X has a different physical address. In other words, each of the pages 160_A_1~16N_Z_X has a physical address, and each physical address of the pages 160_A_1~16N_Z_X is different. When a writing operation is executed by the data storage device 100, the controller 120 determines the physical address of the flash memory 140 for writing or storing data. In addition, the physical addresses are mapped to a plurality of respective logical addresses by the controller 120. Therefore, for the host 200, the host 200 reads or writes data which is stored in a logical address by the data storage device 100 through the logical address.

In one embodiment, the controller 120 calculates the error correction code (ECC) bit value of each page 160_A_1~16N_Z_X by the detection unit of 1 bytes. The controller 120 also statistics the amount of the detection units of the corresponding pages for different ECC bit values, therefore, whether or not each storage plane 160~16N of the flash memory is normal could be determined.

Figure 2:
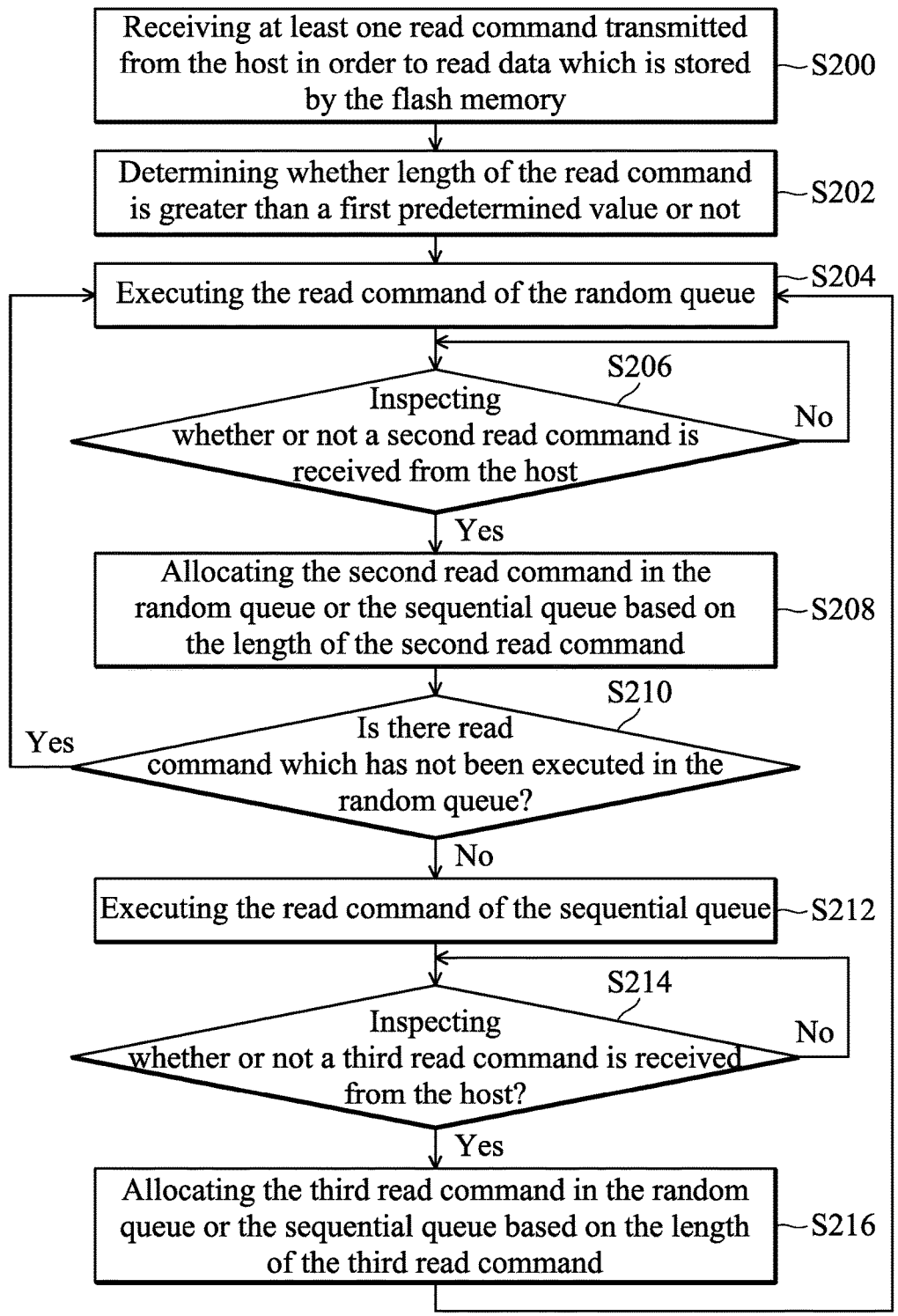
FIG. 2 is a flowchart of a data storage method according to an embodiment of the invention.

FIG. 2 is a flowchart of a data storage method according to an embodiment of the invention. In step S200, the controller 120 receives at least one read command transmitted from the host 200 in order to read data which is stored by the flash memory 140. In step S202, the controller 120 determines whether length of the read command is greater than a first predetermined value or not. If the length of the read command is greater than the first predetermined value, the controller 120 arranges the read command in the sequential queue. If length of the read command is not greater than the first predetermined value, the controller 120 arranges the read command in the random queue.

Therefore, the sequential queue stores one or several read commands whose length is greater than the first predetermined value according to the order of commands transmitted by the host 200. The random queue stores one or several read commands whose length is equal to or less than the first predetermined value according to the order of commands transmitted by the host 200. In one embodiment, the first predetermined value is 4 Kbytes. It should be noted that the value of the first predetermined value is for illustration, not for limitation. Other value could be selected to be the first predetermined value for the proposed data storage device 100 according to other memory standard or using environment.

Afterwards, in step S204, the controller 120 executes the read command of the random queue. In other words, the data storage device 100 executes the read command in the random queue at high priority, and executes the read command in the sequential queue. In step S206, the controller 120 inspects whether or not a second read command is received from the host 200. Therefore, every time after the controller 120 has executed a read command, it will inspect whether another read command (the second read command) from the host 200 is received or not in order to real-time adjust and allocate the access operation of the data storage device 100.

If the controller 120 does not receive the second read command from the host 200, step S206 will be executed. If the controller 120 receives the second read command from the host 200, step S208 will be executed. In step S208, the controller 120 allocates the second read command in the random queue or the sequential queue based on the length of the second read command. The method of allocating the random queue or the sequential queue based on the length of command is illustrated in step S202, and will not be repeated again.

In step S210, the controller 120 inspects whether there is read command which has not been executed in the random queue. If there is read command which has not been executed in the random queue, step S204 will be executed. If there is no read command which has not been executed in the random queue, step S212 will be executed so that the controller 120 executed the read command of the sequential queue. In other words, when there is read command which has not been executed in the random queue, the controller 120 continues to execute the read command in the random queue until there is no read command which has not been executed in the random queue. Afterwards, the controller 120 starts to execute the read command in the sequential queue.

In another embodiment, the frequency of executing the read command in the random queue by the controller 120 is less than or equal to a second predetermined value. Specifically, when the frequency of executing the read command in the random queue by the controller 120 is greater than the second predetermined value, the controller 120 stops executing the read command in the random queue and starts to execute the read command in the sequential queue. For example, the second predetermined value is 16. When the controller 120 keeps executing 16 read commands in the random queue, even though there is a read command which has not been executed in the random queue, the controller 120 still stops executing the read command in the random queue and starts to execute the read command in the sequential queue.

By setting up the second predetermined value, the controller 120 could be enforced to execute the read command in the sequential queue to prevent the read command in the sequential queue from being held for a long time to effect the data access by the host 200. Specifically, the setting of the second predetermined value is related to the operation speed of the host 200. When the operation speed of the host 200 is faster, the value of the second predetermined value will be smaller.

Afterwards, in step S214, the controller inspects whether or not a third read command is received from the host 200 in order to real-time adjust and allocate the access operation of the data storage device 100. If the controller 120 does not receive the third read command from the host 200, step S214 will be executed. If the controller 120 receives the third read command from the host 200, step S216 will be executed. In step S216, the controller 120 allocates the third read command in the random queue or the sequential queue based on the length of the third read command. The method of allocating the random queue or the sequential queue based on the length of command is illustrated in step S202, and will not be repeated again. Afterwards, step S204 is executed. The controller 120 executes the read command in the random queue at high priority, and executes the read command in the sequential queue.

It should be noted that the above embodiments are mainly for illustrating a situation wherein the command transmitted by the host 200 is a read command. In other embodiments, when the host 200 transmits a write command to write data into the flash memory 160, the data storage device and the data storage method of the present invention are still applicable. Specifically, the controller 120 determines whether the length of the write command is greater than a first predetermined value or not. If the length of the write command is greater than the first predetermined value, the controller 120 arranges the read command in the sequential queue. If length of the write command is not greater than the first predetermined value, the controller 120 arranges the read command in the random queue. The controller 120 executes the read command in the random queue at high priority, and executes the read command in the sequential queue.

In one embodiment, when the controller 120 receives the read command and the write command from the host 200, the sequence of executing commands by the controller 120 is: the read command in the random queue, the read command in the sequential queue, the write command in the random queue and the write command in the sequential queue. Generally, writing data takes more time than reading data. Therefore, the data storage device 100 executes the read command at high priority and then executes the write command in order to improve the operating efficiency of the data storage device 100.

Figure 3:
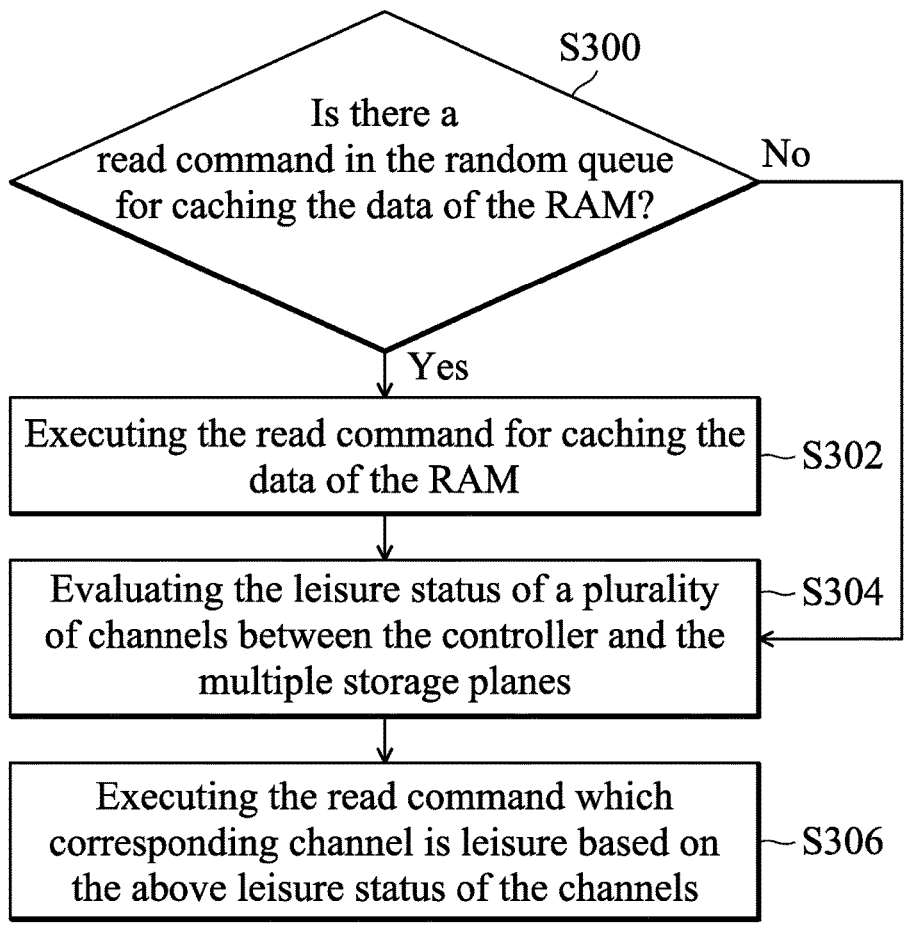
FIG. 3 is a flowchart of a data storage method according to another embodiment of the invention.

FIG. 3 is a flowchart of a data storage method according to another embodiment of the invention. The embodiment illustrates when method of executing sequence for allocating the read command by the controller 120 when there are multiple read commands in the random queue. Firstly in step S300, the controller 120 determines whether or not there is a read command in the random queue for caching the data of the RAM 180. In other words, whether or not the above read command is related to the data stored in the RAM 180.

If there is no read command for caching the data of the RAM 180, step S304 will be executed. If there is a read command in the random queue for caching the data of the RAM 180, step S302 will be executed so that the controller 120 executes the read command for caching the data of the RAM 180. Afterwards, in step S304, the controller 120 evaluates the leisure status of a plurality of channels between the controller 120 and the multiple storage planes 160~16N. In step S306, the controller 120 executes the read command which corresponding channel is leisure based on the above leisure status of the channels. In other words, when the controller 120 detects that a channel is performing data transmission (which means it is not on the leisure status), the read command corresponding to the above channel will not be executed in order to avoid the channel congestion and affect the performance of the data storage device 100.

FIG. 4 is a schematic diagram of storing read command and its related information by utilizing a table DT according to an embodiment of the invention. In the embodiment, the table DT records a plurality of read commands #1~#6 in the random queue and the related information of their corresponding addresses. As shown in FIG. 4, the data which will be read by the read command #0 is stored in the storage plane 160 (i.e., CE0), the data which will be read by the read command #1 is also stored in the storage plane 160 (i.e., CE0), the data which will be read by the read command #2 is stored in the RAM 180. The read commands #1~#6 are randomly arranged in the random queue. Therefore, regardless of the address information for storing the data, the controller 120 executes the read commands #1~#6 sequentially.

In one embodiment, the controller 120 executes the read command about data of caching the RAM 180 at high priority. Therefore, the controller 120 executes the read commands #3 and #6 of FIG. 4 at high priority. Afterwards, according to the sequence of the random queue as shown in the table DT, the controller 120 executes the read command #1. It should be noted that because the read command #2 has the same corresponding address as the read command #1, the channel between CE0 and the controller 120 has been occupied by the read command #1. Therefore, considering the leisure status of the channel, after the controller 120 executes the read command #1, it executes the read command #4 rather than the read command #2 in order to improve the operating efficiency of the data storage device 100.

By utilizing the data storage device and the data storage method of the present invention, the length of the read command could be detected to arrange the read command in the random queue or the sequential queue accordingly. Specifically, the data storage device executes the read command in the random queue at high priority, and real-time updates the status of the random queue and the sequential queue with a table. Therefore, the performance and reliability for accessing the data could be confirmed.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name to distinguish the claim elements. While the invention has been described by way of example and in terms of the preferred embodiments, it should be understood that the invention is not limited to the disclosed embodiments. On the contrary, it is intended to cover various modifications and similar arrangements. Therefore, the scope of the appended claims should be accorded the broadest interpretation so as to encompass all such modifications and similar arrangements.

What is claimed is:

1. A data storage device, comprising:
a flash memory, configured to store at least one data; and
a controller, coupled to the flash memory, configured to receive at least one read command transmitted from a host, and to read the data stored by the flash memory according to the read command, wherein:
the controller determines whether or not a length of the read command is greater than a first predetermined value, wherein when the length is greater than the first predetermined value, the controller arranges the read command in a sequential queue, and when the length is not greater than the first predetermined value, the controller arranges the read command in a random queue, and the controller executes the read command in the random queue with a higher priority than the read command in the sequential queue,
wherein after the controller executes the read command in the random queue, the controller inspects whether or not read commands remain unexecuted in the random queue,
wherein when the random queue contains unexecuted read commands, the controller continues to execute the read commands in the random queue until all the read commands in the random queue have been executed, and the controller starts to execute read commands in the sequential queue.

2. The data storage device as claimed in claim 1, wherein:
after the controller executes the read commands in the random queue, the controller inspects whether or not a second read command is received from the host, and the controller arranges the second read command in the random queue or the sequential queue based on a length of the second read command.

3. The data storage device as claimed in claim 1, wherein:
in response to a number of the read commands in the random queue successively executed by the controller being greater than a second predetermined value, the controller stops executing the read commands in the random queue and starts to execute the read commands in the sequential queue.

4. The data storage device as claimed in claim 3, wherein:
after the controller executes the read commands in the sequential queue, the controller inspects whether or not a third read command is received from the host, and the controller arranges the third read command in the random queue or the sequential queue based on a length of the third read command.

5. The data storage device as claimed in claim 1, wherein:
the first predetermined value is a minimum storage unit of a Universal Flash Storage (UFS) standard.

6. The data storage device as claimed in claim 1, wherein the data storage device further comprises a random access memory (RAM) to temporarily store or cache the data, wherein:
when the read commands are in the random queue, the controller executes one of the read commands for caching the data of the RAM with a higher priority than those the read commands in the sequential queue.

7. The data storage device as claimed in claim 6, wherein the flash memory comprises a plurality of storage planes, each of the storage planes comprises a plurality of blocks, and each of the storage planes is coupled to the controller respectively by a channel, wherein:
after the controller executes one of the read commands for caching the data of the RAM, the controller executes the read command of the corresponding channel at leisure based on leisure status of the channels.

8. A data storage method for optimizing the data storage device, wherein the data storage device comprises a flash memory, a controller, and a RAM, wherein the flash memory comprises a plurality of storage planes, each of the storage planes comprises a plurality of blocks, and each of the storage planes is coupled to the controller respectively by a channel, the data storage method comprising:
receiving at least one read command transmitted from a host, wherein the read command is utilized for reading the data stored by the flash memory;
determining whether or not a length of the read command is greater than a first predetermined value, wherein when the length is greater than the first predetermined value, the controller arranges the read command in a sequential queue, and when the length is not greater than the first predetermined value, the controller arranges the read command in a random queue;
executing the read command in the random queue at a higher priority than the read command in the sequential queue;
after executing the read command in the random queue, inspecting whether or not unexecuted read commands remain in the random queue;
when the unexecuted read commands remain in the random queue, continuing to execute the unexecuted read commands in the random queue until there is no read command in the random queue which has not been executed; and
starting to execute read commands in the sequential queue.

9. The data storage method as claimed in claim 8, further comprising:
after executing the read commands in the random queue, inspecting whether or not a second read command is received from the host; and
arranging the second read command in the random queue or the sequential queue based on a length of the second read command.

10. The data storage method as claimed in claim 8, further comprising:
in response to a number of the read commands in the random queue successively executed being greater than a second predetermined value, stopping execution of the read commands in the random queue and starting to execute the read commands in the sequential queue.

11. The data storage method as claimed in claim 10, further comprising:
after executing the read commands in the sequential queue, inspecting whether or not a third read command is received from the host, and arranging the third read command in the random queue or the sequential queue based on a length of the third read command.

12. The data storage method as claimed in claim 8, wherein:
the first predetermined value is a minimum storage unit of a Universal Flash Storage (UFS) standard.

13. The data storage method as claimed in claim 8, further comprising:
when the read commands are in the random queue, executing the read command for caching the data of a random access memory (RAM) at a higher priority than the read commands in the sequential queue.

14. The data storage method as claimed in claim 13, further comprising:

after executing the read command for caching the data of the RAM, executing the read command of the corresponding channel at leisure based on leisure status of the channels.

* * * * *